US010659787B1

(12) United States Patent
Brailovskiy et al.

(10) Patent No.: US 10,659,787 B1
(45) Date of Patent: May 19, 2020

(54) ENHANCED COMPRESSION OF VIDEO DATA

(71) Applicant: Amazon Technologies, Inc., Seattle, WA (US)

(72) Inventors: Ilya Vladimirovich Brailovskiy, Los Gatos, CA (US); Raghavan Manmatha, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 70 days.

(21) Appl. No.: 16/137,398

(22) Filed: Sep. 20, 2018

(51) Int. Cl.
*H04N 19/136* (2014.01)
*H04N 19/124* (2014.01)
*H04N 19/13* (2014.01)
*H04N 19/625* (2014.01)
*H04N 19/179* (2014.01)
*H04N 19/51* (2014.01)
*H04N 19/172* (2014.01)

(52) U.S. Cl.
CPC ......... *H04N 19/136* (2014.11); *H04N 19/124* (2014.11); *H04N 19/13* (2014.11); *H04N 19/172* (2014.11); *H04N 19/179* (2014.11); *H04N 19/51* (2014.11); *H04N 19/625* (2014.11)

(58) Field of Classification Search
CPC .................................................. H04N 19/136
USPC ..................................................... 375/240.03
See application file for complete search history.

(56) References Cited

U.S. PATENT DOCUMENTS

| 2011/0082690 A1* | 4/2011 | Togami | H04R 1/406 704/201 |
| 2015/0371638 A1* | 12/2015 | Ma | G10L 15/065 704/275 |

OTHER PUBLICATIONS

Tappen et al.; Recovering Intrinsic Images from a Single Image; IEEE Transactions on Pattern Analysis and Machine Intelligence; Jul. 25, 2005; 8 pgs ; vol. 27; Issue 9.
Zhou et al.; Learning Data-driven Reflectance Priors for Intrinsic Image Decomposition; 2015 IEEE International Conference on Computer Vision (ICCV); Oct. 8, 2015; 9 pgs.
Hui et al.; Illuminant Spectra-based Source Separation Using Flash Photography; IEEE Intl. Conference Computer Vision and Pattern Recognition (CVPR); Nov. 27, 2017; 10 pgs.

* cited by examiner

*Primary Examiner* — Yulin Sun
(74) *Attorney, Agent, or Firm* — K&L Gates LLP

(57) ABSTRACT

Techniques are generally described for enhanced compression of video data. In various examples, the techniques may include receiving first video data representing a scene in an environment. The techniques may further include generating illumination map data representing illumination of the scene in the first video data. The techniques may further comprise generating reflectance map data representing a reflectance of at least one object in the first video data. In some examples, the techniques may include sending, to a second computing device, the illumination map data and the reflectance map data. The techniques may further include receiving second video data representing the scene. The techniques may include determining a first illumination difference between the second video data and the first video data. The techniques may comprise sending, to the second computing device, the first illumination difference.

20 Claims, 6 Drawing Sheets

ENHANCED COMPRESSION OF VIDEO DATA

BACKGROUND

Video and/or other digital media may be sent between computing devices over a network. In some examples, videos may be encoded by a server, sent to a client computing device, where it is decoded and played back by the client computing device while subsequent portions of the video are still being transmitted to the client computing device by the server. Such video transmission and playback is often referred to as "streaming". Network conditions can change during streaming due to changes and/or increases in network traffic. For example, network conditions may sometimes deteriorate, which may lead to pauses or degradation of the streaming video as it is played.

Provided herein are technical solutions to improve sending of video and other types of data that may reduce problems associated with changing network conditions.

DETAILED DESCRIPTION

Figure 1:
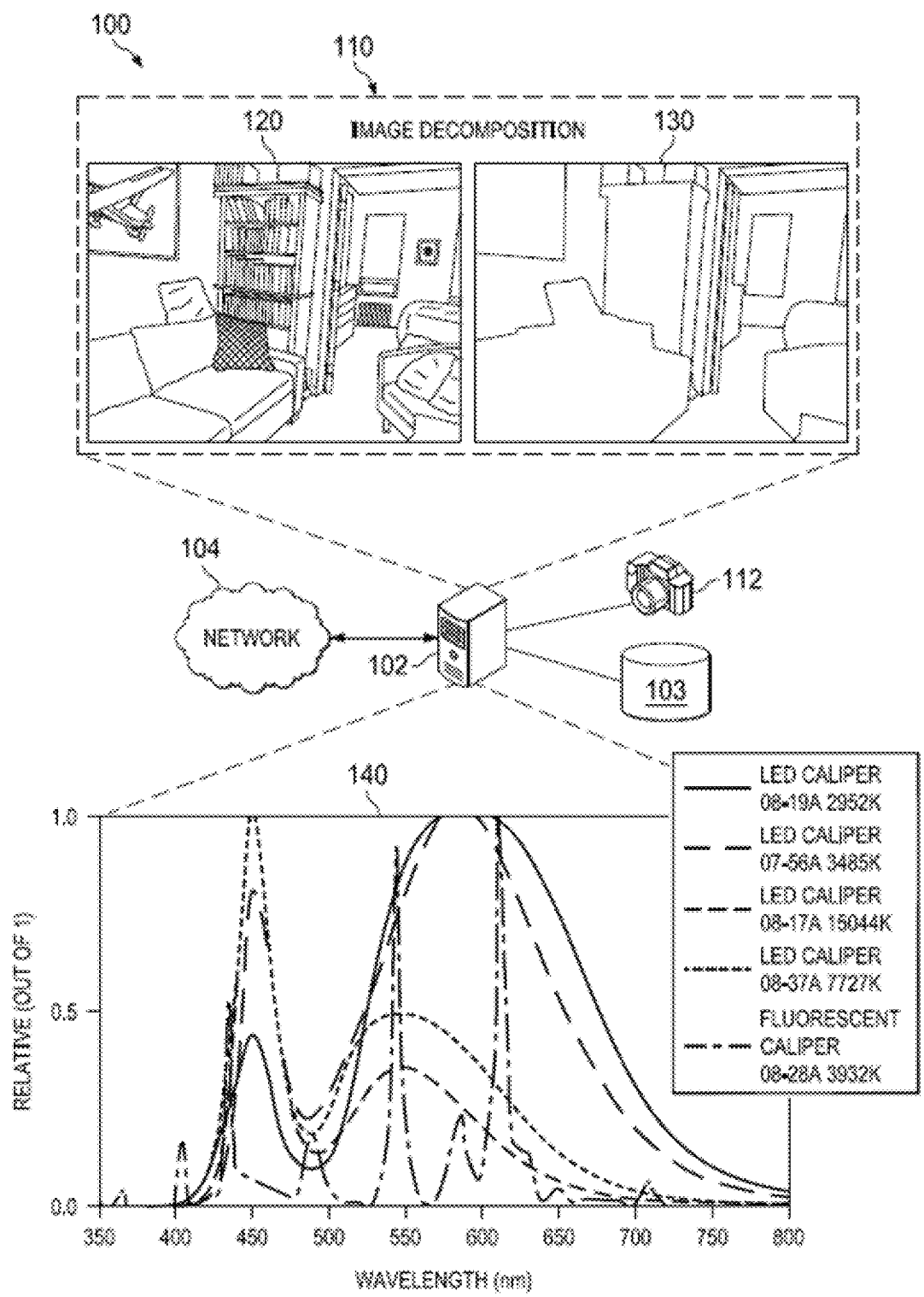
FIG. 1 depicts a system for enhanced compression of video data, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various embodiments, new video data frame types are described that are effective to enhance compression to improve video and/or image data transmission. In digital video technology, a video may be represented by a number of image frames that may be displayed in sequence during playback. A video frame is comprised of data representing rows and columns of pixels. The resolution of a particular video frame is sometimes described by the width of the frame, in terms of a first number of pixels, by the height of the frame, in terms of a second number of pixels. The data representing video frames may be compressed using different picture types or frame types. Some examples of video frames may include intra-coded picture frames, predicted picture frames, and/or bi-predictive frames. Additionally, the present disclosure describes additional frame types that may be used to enhance traditional compression techniques for video transmission, as described in further detail below. The term "frame" can refer to the data representing an entire image captured during a time interval (e.g., all rows and columns of pixels comprising the particular image). The term "picture" refers to both frames and fields. A "field" is a partial image of a frame, which can be represented by, for example, data representing either the odd-numbered or even-numbered scanning lines of the frame. Generally, the "images", "videos", "frames", "fields" and "pictures" described herein comprise data representing the respective images, videos, frames, fields and pictures. In some examples, the data representing the various images, videos, frames, fields and pictures may be rendered on a display to produce one or more visible depictions of the underlying data.

Reference frames are frames of a compressed video that are used to define future frames and come in various types. A compressed video may comprise one or more frames that do not include all of the pixel data within the frames themselves, but rather reference pixel values of other frames (e.g., reference frames). Intra-coded picture frames ("I-frames") include detailed pixel data in order to be self-decodable and to provide reference pixel values for other inter-coded picture frames. As a result, I-frames and other long term reference frames do not require other video frames in order to be decoded, but provide the lowest amount of data compression. I-frames are typically large in terms of an amount of memory used to store an I-frame. In some examples, I-frames may range from 40 kb-80 kb. During periods of network congestion, the large size of traditional I-frames may cause delayed transmission of video data and/or an interruption in video streaming.

In some examples, a reference frame that is used as a reference for subsequent frames during a segment of the video may be referred to herein as a long term reference frame ("LTR frame"). Predicted picture frames ("P-frames") contain only the changes in the pixel values from a previous frame, and therefore P-frames use data from previous frames to decompress the P-frame. As a result, P-frames are more compressible than I-frames. Bi-predictive picture frames ("B-frames") can be decoded using both previous and forward frames for data reference. As set forth above, frequent transmission of traditional I-frames can cause network congestion because of their increased size (e.g., the number of bits of data comprising the I-frame) relative to the P-frames and B-frames.

In various embodiments described herein, new reference frame types are described that are smaller in size relative to traditional I-frames. Additionally, other backward-reference frames described herein may reference the new reference frame types and may provide updated illumination information such that lightning changes in the scene (e.g., lighting changes on a scene comprising one or more illuminated regions and/or surfaces) may be represented based on the new reference frame type together with the updated illumination information. As described in further detail below, the various frame types and video encoding techniques described herein may be particularly beneficial in certain environments. For example, the various frame types and video encoding techniques described herein may be particularly advantageous for video captured by stationary camera devices, security and/or surveillance cameras, in screen-sharing contexts, etc.

Every image representing a scene in a physical environment may be the product of characteristics of the scene. Two examples of characteristics of a scene are the shading of a scene and the reflectance of a scene. In accordance with various embodiments described herein, a frame of image data representing a scene in a physical environment may comprise different illumination and reflectivity characteristics. In computer vision, the decomposition of an image into reflectance maps (albedo) and illumination maps (shading) may be referred to as "intrinsic image decomposition". Reflectivity may be measured as the proportion of incident light or radiation that is reflected by a surface. Shading typically describes the interaction of the surfaces of the scene and the illumination of the scene. Shading is a function of both illumination sources on surfaces of the scene and the direction of the illumination sources relative to the surfaces. Various techniques are known for decomposing an input images into different constituent modalities. For example, intrinsic image decomposition may decompose an input image into a shading image (sometimes referred to as an illumination map or illumination data) and a reflectance image (sometimes referred to as a reflectivity map, reflectance map, or reflectance data). In various examples, reflectance data of a reflectance map may relate to each surface present within the scene. Similarly, the illumination map may correspond to the reflectance map, with shading data corresponding to the reflectance data for each surface within the scene.

In some examples, intensity gradients may be used to perform intrinsic image decomposition. For example, a large intensity gradient may correspond to reflectance edges within a scene (e.g., the edge of a particular reflectance surface in the image data). Similarly, low-frequency changes may be mainly due to shading. Other approaches may also be used for intrinsic image decomposition. For example, texture statisics related to textures present in the scene, shape, albedo, illumination, chromaticity segmentation, sparsity on reflectances, scales of shading, etc., may aid in performing intrinsic image decomposition and may result in improved reflectance maps and/or illumination maps.

Stationary cameras and/or predominantly static image data (such as is used in desktop sharing or screen sharing) may capture image data that may be predominantly static, meaning that one or more portions and/or objects represented in the image data are not changing (e.g., experiencing movement) over periods of time. For example, a security camera may capture video representing a doorway. Predominantly, the scene may remain unchanged for long periods of time until a person moves within the video and opens or shuts the door. In such examples, the reflectivity of surfaces in the static scene (e.g., the background such as the walls, furniture, door, etc.) may remain unchanged for periods of time. Additionally, in some examples, the illumination of the scene may remain static for periods of time.

In accordance with various aspects of the present disclosure, the reflectivity map and illumination map of a scene, and/or data representations thereof (e.g., illumination map data and/or reflectance/reflectivity map data), may be used as a reference frame or frames. In some examples, reference frames formed using intrinsic image decomposition techniques may sometimes be referred to herein as "intrinsic image decomposition reference frames". Thereafter, when illumination changes occur, parameterized illumination data may be sent in inter-encoded frames that reference the intrinsic image decomposition images (the reference frame(s)). The parameterized illumination difference data of the inter-encoded frames may represent the change in illumination from the illumination map of the reference frame(s) to the current illumination state. In addition, motion in the scene may be represented in the new inter-encoded frames using predictive coding techniques (e.g., motion vectors). Inter-encoded frames including parameterized illumination change data may sometimes be referred to herein as "illumination delta frames". In various examples, using the compression techniques described herein may improve video compression by an order of magnitude over current techniques.

Although reflectivity and illumination maps are typically described herein, in some examples, intrinsic image decomposition techniques may be used to generate other modalities of intrinsic image data apart from or in addition to reflectivity and illumination maps. For example, in the case of an outdoor camera, image data may be decomposed into reflectivity maps, illumination maps, and weather data indicating a current weather state. Generally, decomposition of image data may be used to decompose an image into characteristic data of the image (e.g., data that makes up and/or describes a characteristic of the image).

FIG. 1 depicts a system for enhanced compression of video data, in accordance with various embodiments of the present disclosure.

The system 100 comprises image capture device 112, processor(s) 102, and a computer readable, non-transitory memory 103. In various examples, one or more of the techniques described herein may be performed by a processor included within a housing of image capture device 112. In other examples, one or more of the image processing techniques described herein may be performed by a computing device accessible via a communications network, such as network 104. Accordingly, as depicted in FIG. 1, in some examples, image capture device 112 may send image data over network 104 to one or more processors 102 for image processing such as the various encoding and/or compression techniques described herein. In other examples, image capture device 112 may comprise one or more processors and/or a memory effective to perform the various image processing techniques described herein. Network 104 may be, for example, the internet, an intranet, a wide area network, a local area network, or the like. In some examples, image capture device 112 and/or processor(s) 102 may be effective to send and receive data over network 104.

In various examples, instead of being captured by an image capture device 112, the various image data and/or video data described herein may be generated by one or more software modules executed by processor(s) 102. For example, the image data and/or video data may be graphical content generated by a program executed by processor(s) 102. Additionally, as video data comprises multiple frames of image data, where applicable, the terminology "image data" and "video data" may be used interchangeably herein.

Image capture device 112 may include, for example, a digital camera module. The digital camera module may comprise any suitable type of image sensor device or devices, such as a charge coupled device (CCD) and/or a complementary metal-oxide semiconductor (CMOS) sensor effective to capture image data from a local environment of image capture device 112. For example, image capture device 112 may include one or more lenses and may be positioned so as to capture images of a portion of the environment disposed along an optical axis (e.g., a light path) of image capture device 112. In various examples, image capture device 112 may be a stationary camera such as a home surveillance camera and/or a web camera used for video conferencing. Although in FIG. 1, processor(s) 102 are depicted separately from image capture device 112, in various examples, processor(s) 102 may be located within the same housing as image capture device 112.

In various examples, processor(s) 102 may receive an input frame of image data representing a scene. For example, as shown in FIG. 1, processor(s) 102 may receive an input frame of image data representing an interior of a home. Processor(s) 102 may be effective to perform image decomposition 110 on the input frame of image data to generate image data representing various characteristics of the input frame of image data. In the example depicted in FIG. 1, processor(s) 102 may generate illumination map 120 and reflectivity map 130. The illumination map 120 shows the lighting and shading on the scene irrespective of the surface material reflectivity. Illumination map 120 comprises image data representing illumination characteristics of the scene. Similarly, the reflectivity map 130 shows the surface material reflectivity irrespective of the lighting on the scene.

Intrinsic image decomposition rests upon the principle that an observed luminance image is the product of the reflectance image times the shading (illumination) image. Constraints are placed on the frame of image data to capture the statistical and/or physical regularities in the scene to separate the reflectance map from the illumination map. Various techniques may be used to decompose an image into illumination map 120 and reflectivity map 130 (or to decompose the input frame of image data into one or more other characteristic images). For example, conditional random field (CRF) models, convolutional neural networks (CNNs), and other supervised or unsupervised machine learning models may be used to perform intrinsic image decomposition. Algorithms may be used to find priors for shading images and reflectance images.

Figure 2:
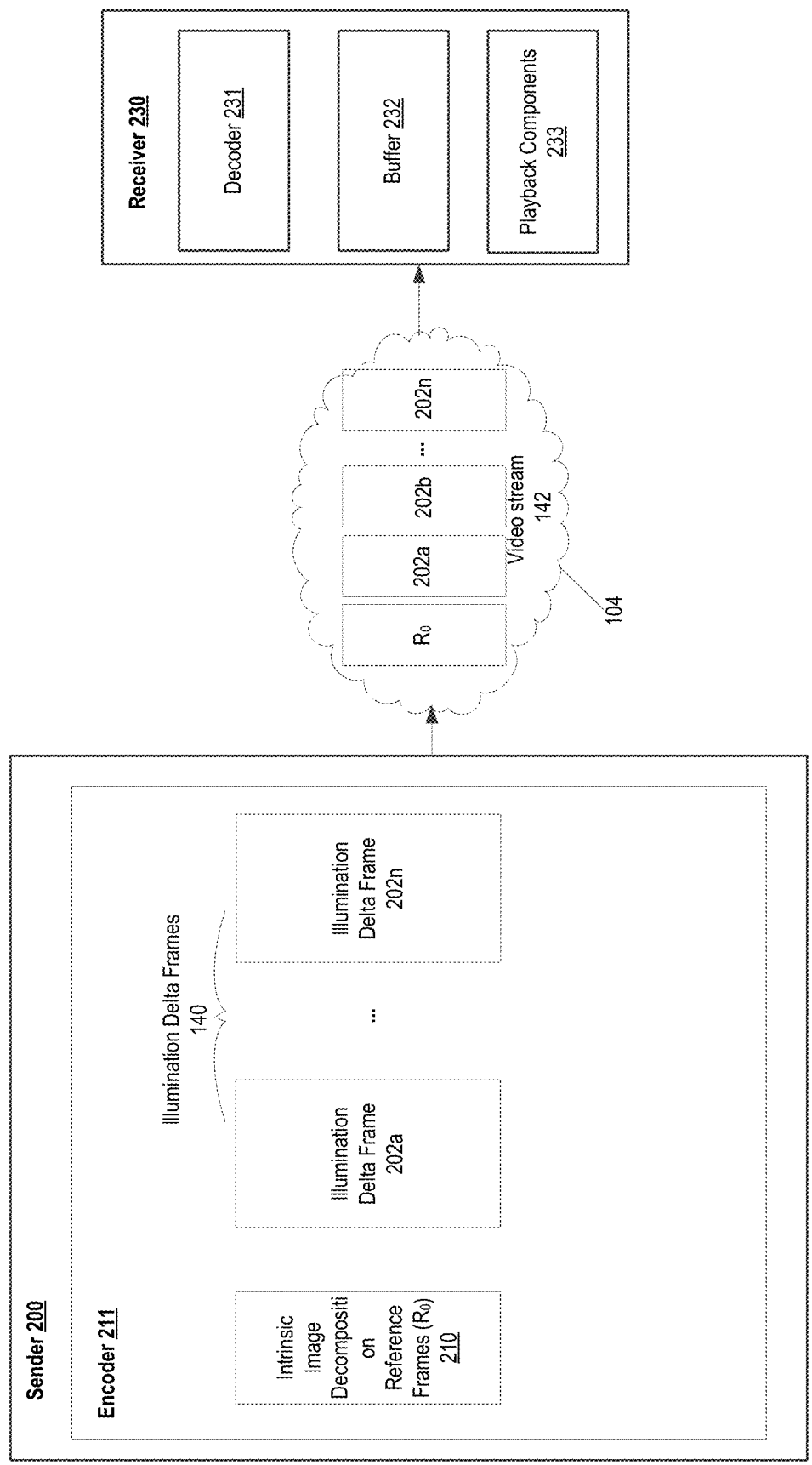
FIG. 2 depicts a sender computing device effective to encode intrinsic image decomposition reference frames and illumination delta frames, in accordance with various embodiments of the present disclosure.

As previously described, the reflectivity map and illumination map of a scene may be used as a reference frame or frames for encoding and decoding subsequent inter-encoded frames of video data. In some examples, reference frames formed using intrinsic image decomposition techniques may sometimes be referred to herein as "intrinsic image decomposition reference frames". Accordingly, as depicted in FIG. 2, intrinsic image decomposition reference frames $R_O$ (210) may comprise the reflectivity map 130 and illumination map 120 of FIG. 1. In various examples, intrinsic image decomposition may be performed by a sender device 200 and/or by an encoder 211 of sender device 200. In various examples, sender device 200 may be referred to as a video encoder device. Alternatively, sender device 200 may send the input image frame representing the background scene over network 104 to a receiver device 230. In various examples, the receiver device may be referred to as a video decoder device. The receiver device and/or a decoder 231 of receiver device 230 may perform intrinsic image decomposition to generate intrinsic image decomposition reference frames $R_O$.

In various examples, the reflectivity map and/or illumination map and/or reference frames including such data may be intra-encoded. For example, the illumination map and/or reflectivity map may be encoded as a compressed representation using an orthogonal image transform such as discrete cosine transform (DCT), a Fourier transform, a Hadamard transform, and/or any other "lossy" or lossless image transform used to represent image data.

In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during quantization process and rounded to the nearest integer, to further compress the data. In various examples, the quantization factors may be determined using a rate control algorithm. A rate control algorithm may solve an optimization problem to determine the number of bits that should be used to encode macroblocks of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After the quantization process, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data. In various examples, the quantization factors used during quantization process may be increased in order to further reduce the size of the compressed representation of the reflectivity map and/or illumination map in terms of a number of bits needed to represent the reflectivity map and/or illumination map.

In various examples, encoder 211 of sender device 200 may comprise a dedicated video encoder integrated circuit and/or video encoding software executable on a general purpose computer. Additionally, receiver device 230 may include a respective decoder 231 for decoding of video stream 142. Additionally, receiver device 230 may comprise a buffer or other memory for storing received frames of image data and/or video. In various examples, decoder 231 may comprise a dedicated video decoder integrated circuit and/or video decoding software executable on a general purpose computer. Receiver device 230 may also include one or more playback components 233 for playback of the sent video stream. Playback component 233 may be, for example, a media player, web browser, and/or another playback component software application executed using one or more processors of a computing device. In some examples, decoder 231 may be wholly or partially included within or integrated with one or more playback components 233. In some examples, video stream 142 may be sent using a communications protocol that is commonly employed for adaptive bitrate streaming, such as hypertext transfer protocol (HTTP).

Referring again to FIG. 1, when illumination changes occur on the scene, parameterized illumination difference data may be sent in inter-encoded frames that reference the intrinsic image decomposition images (e.g., the reference frame(s)). As previously described, inter-encoded frames including parameterized illumination change data may sometimes be referred to herein as "illumination delta frames". Illumination difference data 140 may be an example of data representing a change in illumination of the scene over time. The illumination difference data 140 may be parameterized and may be included in an illumination delta frame referencing the intrinsic image decomposition reference frames. Illumination difference data 140 depicted in FIG. 1 is an example of a spectral power distribution curve (PDC) describing the power per unit area per unit wavelength for a variety of different illumination sources. In some examples, both the chromaticity and luminance of a color may be derived using the spectral PDC. In various examples, a processing unit of a camera may be effective to generate spectral PDC representing a scene. In various other examples, deep learning accelerators may be used to generate spectral PDC or other illumination difference data on a scene. In at least some examples, video graphic cards (e.g., graphics processing units) may be used to generate spectral PDCs. In still further examples, an application specific integrated circuit and/or a programmable circuit may be used. In various examples, the spectral power distribution curve may be sent as one or more power per unit area per unit wavelength values. In various examples, encoder 211 may be effective to split frames of image data into the intrinsic decomposition images and may thereafter send illumination updates in the form of illumination delta frames 202a, . . . , 202n. As previously described illumination delta frames 202a, . . . , 202n may comprise parameterized representations of changing illumination sources on the scene (e.g., a numerical representation of the spectral power distribution curve). Illumination delta frames 202a, . . . , 202n may comprise data representing a difference in the illumination of the scene between the reference frame (e.g., intrinsic image decomposition reference frame ($R_O$) 210) and the current illumination of the scene. In various examples, the illumination delta frames may represent illumination differences at a block level (e.g., 8×8 blocks of pixels, 16×16 blocks of pixels, etc.) and/or at a pixel level (e.g., the illumination delta frames may describe illumination changes for each pixel). In various examples, a motion vector representing motion between a pixel (or block of pixels) of the intrinsic image decomposition reference frame ($R_O$) 210 and a corresponding pixel (or block of pixels) in an illumination delta frame may be included in the relevant illumination delta frame. The motion vector may reference the pixel (or block of pixels) in the video data of the first frame. The motion vector may represent the difference between an earlier position of the pixel (or block of pixels) in the reference frame and the current location of the pixel (or block of pixels) following the motion on the scene.

However, in some other examples, different types of illumination difference data may be sent apart from spectral power distribution curves. For example, gamma curves may instead be used. Gamma curves may be effective to characterize illumination of a scene including the location and/or geometry for regions of illumination in the scene. The illumination difference data 140 may describe a change in illumination relative to the illumination present in the intrinsic image decomposition reference frames. Using the illumination difference data 140 and the intrinsic image decomposition reference frames, the illumination state of the scene may be updated without requiring transmission of a new intra-encoded frame such as a traditional I-frame. In turn, sending the illumination delta frames may reduce the number of bits required to represent the video data.

As described in further detail below, the illumination difference data 140 may be parameterized by a sending device (e.g., sender device 200) and/or by an encoder of a sending device (e.g., encoder 211). Parameterizing the illumination difference data and sending the resulting parameters in the illumination delta frames instead of the full power distribution curves or gamma curves may further reduce the number of bits required to represent the video data (e.g., video stream 142). As depicted in FIG. 2, illumination delta frames 202a, 202b, . . . , 202n may be sent over network 104 to receiver device 230. Illumination delta frames 202a, 202b, . . . , 202n (collectively illumination difference data 140) may comprise illumination difference data describing changing illumination of the scene. Decoder 231 may be effective to combine the illumination difference data with the intrinsic image decomposition reference frames 210 (e.g., the reflectivity map and the illumination map) to generate image data representing the scene with the updated illumination difference data.

In various examples, a determination may be made by an encoder and/or a decoder of a device that greater than a threshold number of blocks of pixels (and/or a threshold number of pixels) in a current frame do not correspond to any blocks of pixels (or pixels) in the first frame. For example, motion and/or a person entering the scene may cause blocks of the current frame to not correspond to blocks of the current intrinsic image decomposition reference frames (e.g., $R_O$). In response, in some examples the encoder device and/or decoder device may generate new reflectivity and/or illumination maps to be used as an updated reference frame/frames. The updated reference frame(s) may be stored by the decoder of the recipient device. In some other examples, motion may be encoded using traditional inter-coding techniques (e.g., motion vectors).

Figure 3:
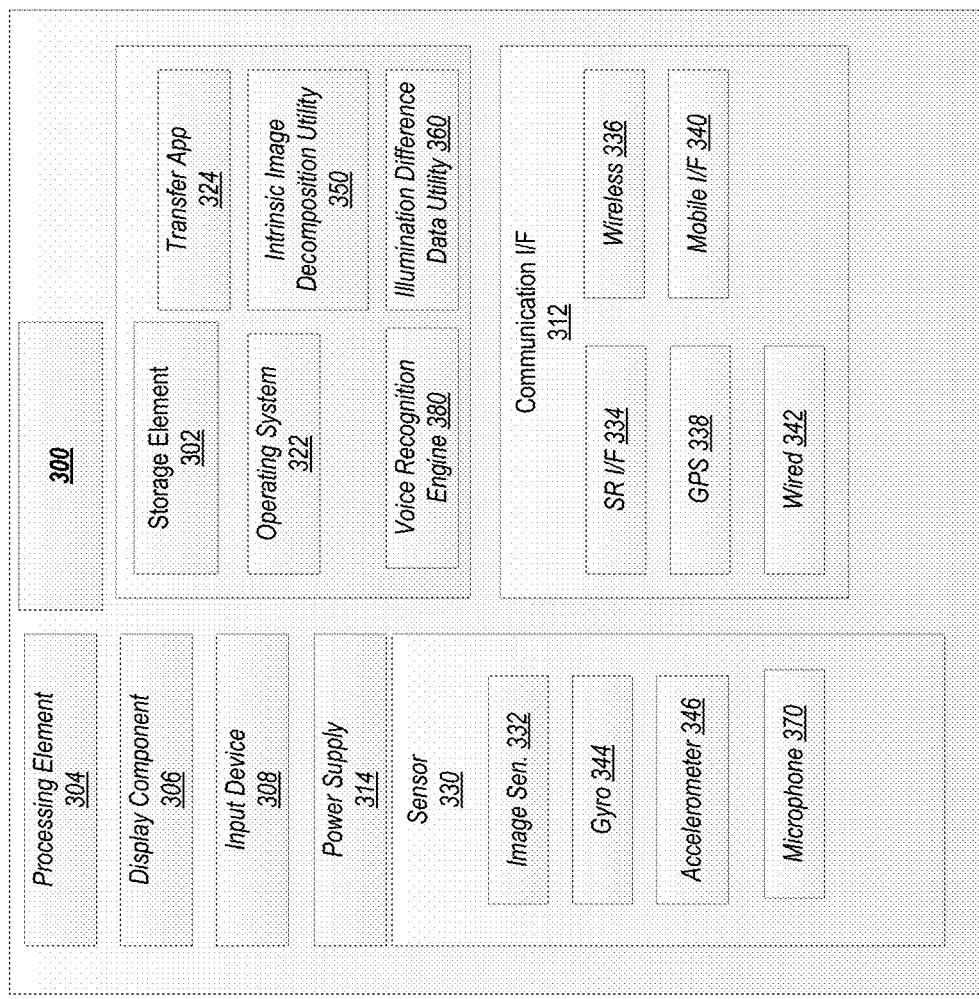
FIG. 3 is a block diagram showing an example architecture of a computing device that may be used in accordance with various techniques described herein.

FIG. 3 is a block diagram showing an example architecture of a computing device that may be used in accordance with various techniques described herein.

It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs) and/or image signal processors (ISPs). In some examples, the processing element 304 may be effective to filter image data into different frequency bands, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300 (e.g., image capture device 112). In some examples, the transfer application 324 may also be configured to upload the received images to another device that may perform processing as described herein (e.g., a mobile device, another computing device, and/or receiver device 230).

In some examples, storage element 302 may include an intrinsic image decomposition utility 350. Intrinsic image decomposition utility 350 may be configured to decompose an input frame of image data into characteristic image data, in accordance with the various techniques described herein. For example, intrinsic image decomposition utility 350 may decompose an input frame of image data into an illumination map and a reflectance map. Intrinsic image decomposition utility 350 may use neural networks and/or CRF models to decompose the input image data.

In various examples, storage element 302 may include an illumination difference data utility 360. Illumination difference data utility 360 may receive an input frame of image data and may determine illumination difference data from the input image data. In various examples, the illumination difference data may comprise spectral power distribution curves and/or gamma curves describing the illumination of the scene. In various examples, illumination difference data utility 360 may be effective to parameterize the illumination difference data. For example, illumination difference data utility 360 may use polynomial interpolation or spline interpolation to generate an approximation of the illumination difference data. Illumination difference data utility 360 may encode the parameterized illumination difference data in illumination delta frames. Illumination delta frames may reference the intrinsic image decomposition reference frames and may be effective to "re-light" the intrinsic image decomposition reference frames with the new illumination difference data.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 112 (shown in FIG. 1), mobile interface 340 may allow image capture device 112 to communicate with one or more other computing devices such as processor(s) 102. For example, image capture device 112 may receive a command from a user device, an application of a user device, or a voice recognition server to capture an image or video. Image capture device 112 may receive a command from the user device to send the captured image or video to the mobile device or to another computing device.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be image capture device 112 shown and described in FIG. 1.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 112 (shown in FIG. 1). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

Figure 4:
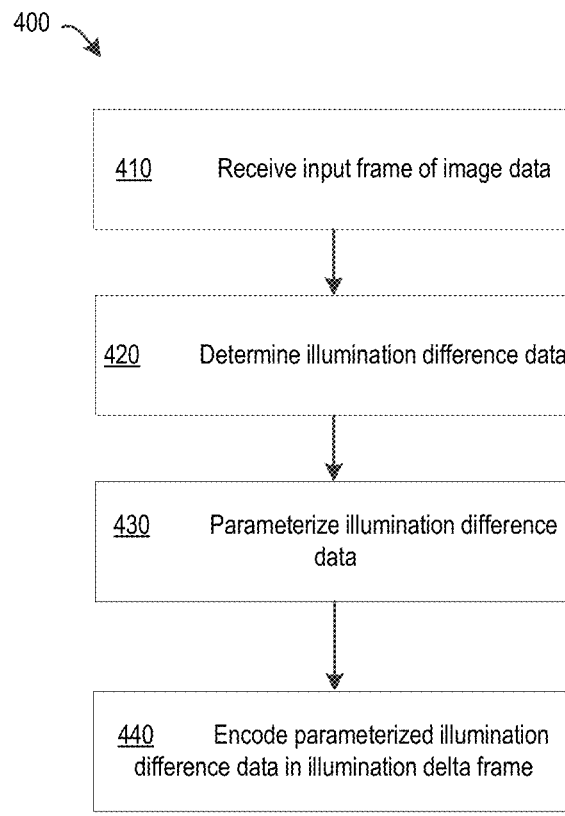
FIG. 4 depicts a flowchart illustrating an example process for parameterizing illumination data and encoding illumination delta frames, in accordance with embodiments of the present disclosure.

FIG. 4 depicts a flowchart illustrating an example process 400 for generating a parameterized representation of the illumination difference data and encoding illumination delta frames, in accordance with embodiments of the present disclosure.

The process 400 may begin at operation 410 at which an input frame of image data may be received. The input frame of image data may represent a change in lighting conditions relative to a previous frame and/or relative to an intrinsic image decomposition reference frame.

The process 400 may continue from operation 410 to operation 420 at which illumination difference data may be determined. For example, the spectral power distribution curves or gamma curves describing the illumination of the input frame of image data may be determined. In various examples, the spectral power distribution for a radiant exitance may be given by $$M(\lambda) = \frac{\partial^2 \Phi}{\partial A \partial \lambda}$$

where M (A) is the spectral irradiance (or exitance) of the light in W/m$^3$, $\Phi$ is the radiant flux of the light source in watts, A is the area over which the radiant flux is integrated in m$^2$ and $\lambda$ is the wavelength in meters or nanometers. Spectral power distribution curves may describe light sources and changes in light sources as applied to the scene. A neural network may be trained to perform style transfer to apply the new, updated light sources described by the spectral power distribution curves to the scene to make the scene appear naturally lit.

The process 400 may continue from operation 420 to operation 430 at which a parameterized representation of the illumination difference data determined at operation 420 may be generated. In various examples, polynomial interpolation may be used to parameterize the curve. In an example, a quadratic polynomial interpolation model may be used with 5 points to interpolate between. In at least some examples, the number of points for interpolation may be a parameter that is passed along with the illumination difference data to the receiver device (e.g., receiver 230). Although a quadratic interpolation is discussed above, any degree polynomial and/or spline interpolation scheme may be used in accordance with the various techniques described herein.

The process 400 may continue from operation 430 to operation 440 at which the parameterized illumination difference data may be encoded in one or more illumination delta frames. In various examples, a numerical representation (e.g., numerical data) representing the coefficients of the polynomial may be generated. For example, a fixed point F32 floating number representation of the polynomial coefficients written in a predefined order may be used. In other implementations, different sized number representations and different parameterized representations of the illumination difference data may be used. The polynomial coefficients may be compressed to generate a compressed representation of the numerical data. For example, a binary arithmetic encoder, entropy encoding, Huffman encoding, or the like may be used to compress the numerical data. Various other encoding techniques may be used in accordance with the present disclosure.

Figure 5:
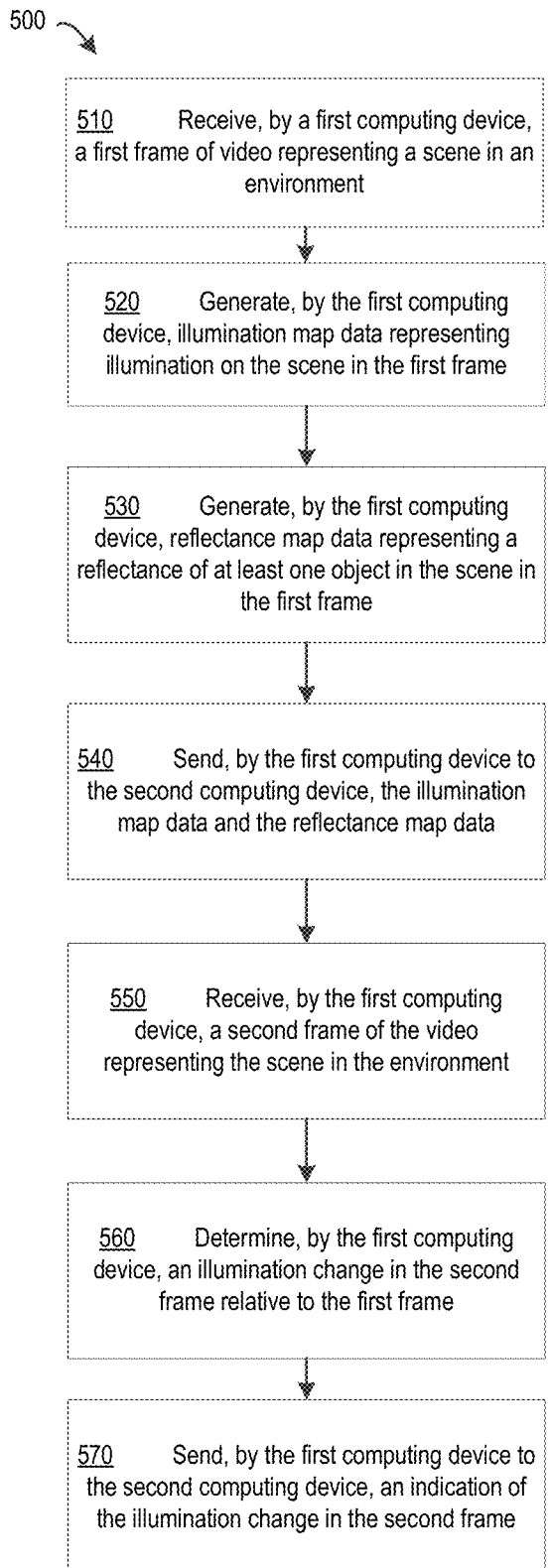
FIG. 5 depicts a flowchart illustrating an example process for enhanced compression of video data, in accordance with embodiments of the present disclosure.

FIG. 5 depicts a flowchart illustrating an example process 500 for enhanced compression of video data, in accordance with embodiments of the present disclosure.

Process 500 of FIG. 5 may begin at operation 510, "Receive, by a first computing device, a video data of a first frame representing a scene in an environment." At operation 510, a first computing device such as sender device 200 or receiver 230 depicted in FIG. 2 may receive a video data of a first frame. In various examples, the frame of video data may be captured by a camera configured to be in communication with the recipient device.

Process 500 of FIG. 5 may continue from operation 510 to operation 520, "Generate, by the first computing device, illumination map data representing illumination of the scene in the first frame". At operation 520, the first computing device may generate illumination map data using intrinsic image decomposition techniques. For example, conditional random field (CRF) models, convolutional neural networks (CNNs), and other supervised or unsupervised machine learning models may be used to perform intrinsic image decomposition. Algorithms may be used to find priors for shading images and reflectance images. For example, an input frame of image data may be decomposed into illumination/shading map and reflectivity map by classifying each image derivative as being caused by a shading change or a reflectance change.

Process 500 of FIG. 5 may continue from operation 520 to operation 530, "Generate, by the first computing device, reflectance map data representing a reflectance of at least one object in the scene in the first frame". At operation 530, the first computing device may generate reflectance map data using intrinsic image decomposition techniques. For example, conditional random field (CRF) models, convolutional neural networks (CNNs), and other supervised or unsupervised machine learning models may be used to perform intrinsic image decomposition. Algorithms may be used to find priors for shading images and reflectance images. For example, an input frame of image data may be decomposed into illumination/shading map and reflectivity map by classifying each image derivative as being caused by a shading change or a reflectance change.

Process 500 of FIG. 5 may continue from operation 530 to operation 540, "Send, by the first computing device to the second computing device, the illumination map data and the reflectance map data". At operation 540, the first computing device may send the illumination map data and the reflectance map data to a different computing device. For example, sender device 200 of FIG. 2 may send intrinsic image decomposition reference frames 210 (including illumination map data and reflectance map data) to receiver device 230 over network 104. In various examples, reflectance map data and illumination map data sent as a reference frame may be intra-encoded.

Process 500 of FIG. 5 may continue from operation 540 to operation 550, "Receive, by the first computing device, a second frame of video data representing the scene in the environment". At operation 550, a first computing device such as sender device 200 or receiver 230 depicted in FIG. 2 may receive a second video data. In various examples, the second video data (e.g. a frame of video data) may be captured by a camera configured to be in communication with the recipient device. In at least some examples, the second frame of video data may be a subsequent frame of image data in a video stream (e.g., video stream 142) relative to the first frame of image data sent at operation 510.

Process 500 of FIG. 5 may continue from operation 550 to operation 560, "Determine, by the first computing device, an illumination change in the second frame relative to the first frame". In various examples, the computing device that receives the second frame of image data, or some other computing device(s), may determine an illumination change in the second frame relative to the first frame of image data. For example, the second computing device may determine spectral PDCs describing illumination of the scene in the second frame.

Process 500 of FIG. 5 may continue from operation 560 to operation 570, "Send, by the first computing device to the second computing device, an indication of the illumination change in the second frame". At operation 570, the first computing device may send an indication of the illumination change in the second frame to the second computing device. The indication of the illumination change may be a parameterized representation of the illumination change determined at operation 560. For example, the first computing device may perform polynomial interpolation to determine a polynomial that approximates a spectral PDC for a particular illumination source for the second frame. The first computing device may use a floating point number or some other data structure to represent the polynomial. For example, the coefficients of the polynomial may be concatenated in a floating point number. The polynomial coefficients may be compressed using, for example, a binary arithmetic encoder, entropy encoding, Huffman encoding, or the like.

Among other benefits, a system in accordance with the present disclosure may improve video and/or image data transmission by reducing the bandwidth required for transmission of video data. In various examples, using intrinsic image decomposition and/or other representations of static, background image data and sending updated illumination difference data allows a decoder to recreate the original image/video frame without requiring re-transmission of data representing static background regions of the scene. Various frames (e.g., the intrinsic image decomposition reference frames and/or the illumination delta frames described herein) may reduce the frame size (in terms of the memory required to store such frames) by at least an order of magnitude as compared to traditional H.264 techniques (e.g., I-frames and traditional P-frames and/or, B-frames). As such, the techniques described herein can reduce network congestion and mitigate encoder/decoder performance issues. Further, the techniques described herein may mitigate interruptions in playback of streamed video and provide improved user experience in a variety of applications such as video chat, live video streams, screen-sharing, movie streaming, surveillance footage, etc., to name a few potential applications. In addition, due to reduced decoding complexity, compute power and processing resources may be conserved using the techniques described herein, allowing processor cycles to become available for other compute operations. The various techniques described herein may be of particular benefit in contexts where the background of the scene is not changing to a large extent over time. Examples of such contexts include surveillance cameras, screen sharing, video conferencing, etc.

Figure 6:
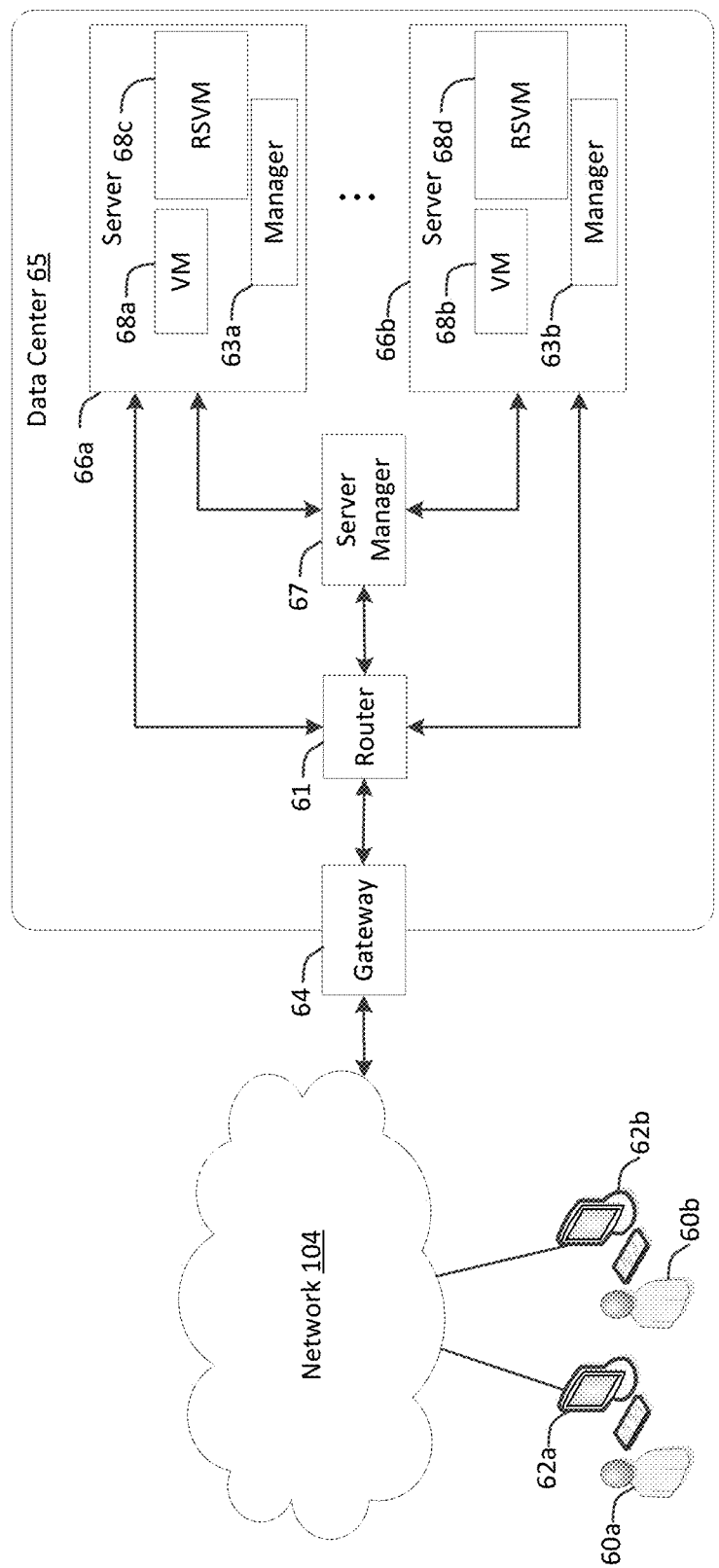
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as computer 62 or in the plural as computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 80 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of compressing video data, the method comprising:
   receiving, by a video encoder device, video data of a first frame, the video data of the first frame depicting a physical environment at a first time;
   generating, from the video data of the first frame by the video encoder device, a reflectance map representing a reflectance of at least one surface of the physical environment;
   generating, from the video data of the first frame by the video encoder device, an illumination map representing shading of the at least one surface of the physical environment;
   sending, by the video encoder device to a video decoder device, the reflectance map and the illumination map;
   receiving, by the video encoder device, video data of a second frame, the video data of the second frame depicting the physical environment at a second time;
   determining, by the video encoder device, a spectral power distribution curve of the video data of the second frame, wherein the spectral power distribution curve represents a difference in illumination of the physical environment between the video data of the first frame and the video data of the second frame;
   generating, by the video encoder device, a third frame comprising a representation of the difference in illumination; and
   sending, by the video encoder device to the video decoder device, the third frame, wherein the video decoder device is effective to reproduce the video data of the second frame using the third frame, the illumination map, and the reflectance map.

2. The method of claim 1, further comprising:
   determining, by the video encoder device, a polynomial that fits to the spectral power distribution curve;
   generating, by the video encoder device, numerical data comprising coefficients of the polynomial; and
   generating a compressed representation of the numerical data using a binary arithmetic encoder executed by the video encoder device, wherein the representation of the difference in illumination comprises the compressed representation of the numerical data.

3. The method of claim 1, further comprising:
   generating, by the video encoder device, a first compressed representation of the reflectance map using a discrete cosine transform; and
   generating, by the video encoder device, a second compressed representation of the illumination map using discrete cosine transform, wherein sending the reflectance map and the illumination map comprises sending the first compressed representation and the second compressed representation.

4. The method of claim 1, further comprising:
   determining a motion vector representing motion between the video data of the first frame and the video data of the second frame for a pixel of the video data, wherein the third frame further comprises the motion vector referencing the pixel in the video data of the first frame.

5. A method comprising:
receiving, by a first computing device, first video data representing a scene in an environment comprising one or more illuminated regions;
generating, by the first computing device using the first video data, first illumination data representing illumination of the scene;
generating, by the first computing device, first reflectance data representing reflectance of at least one object represented in the first video data;
sending, by the first computing device to a second computing device, the first illumination data and the first reflectance data;
receiving, by the first computing device, second video data representing the scene, the second video data including second illumination data and second reflectance data;
determining, by the first computing device, a first difference between the first and the second illumination data; and
sending, by the first computing device to the second computing device, the first difference.

6. The method of claim 5, further comprising:
determining a spectral power distribution curve of the second video data, wherein the spectral power distribution curve comprises, for each illuminated region in the scene, a power per unit area per unit wavelength value, wherein the first difference comprises a numerical representation of the spectral power distribution curve.

7. The method of claim 6, further comprising:
determining a polynomial that approximates the spectral power distribution curve;
determining coefficients of the polynomial; and
generating a representation of the coefficients, wherein the numerical representation of the spectral power distribution curve comprises the numerical representation of the coefficients.

8. The method of claim 5, further comprising:
determining, for a first pixel of the second video data, a motion vector representing a change between the first pixel of the second video data and a corresponding second pixel of the first video data, wherein the change represents motion within the scene;
generating a frame of image data comprising the first difference and the motion vector; and
sending, by the first computing device, the frame of image data to the second computing device.

9. The method of claim 5, wherein the first reflectance data represents reflectance of a first surface of a first object represented in the first video data and the first illumination data represents shading of the first surface of the first object, the method further comprising:
generating third reflectance data representing reflectance of a second surface of the first object represented in the first video data;
generating third illumination data representing shading of the second surface of the first object; and
generating a frame of image data, the frame of image data comprising the first reflectance data, the third reflectance data, the first illumination data, and the third illumination data, wherein sending the first illumination data and the first reflectance data to the second computing device comprises sending the frame of image data to the second computing device.

10. The method of claim 5, further comprising:
determining that greater than a threshold number of pixels in third video data representing the scene in the environment do not correspond to any pixels in the first video data;
generating, by the first computing device, third illumination data representing illumination of the scene in the third video data;
generating, by the first computing device, third reflectance data representing a third reflectance of the at least one object of the scene in the third video data; and
sending, by the first computing device to the second computing device, the third illumination data and the third reflectance data.

11. The method of claim 5, further comprising:
generating a first compressed representation of the first reflectance data; and
generating a second compressed representation of the first illumination data, wherein the sending the first illumination data and the first reflectance data comprises sending the first compressed representation and the second compressed representation to the second computing device.

12. The method of claim 5, further comprising:
determining a spectral power distribution curve of the second video data, wherein the spectral power distribution curve comprises, for each illuminated region in the scene, a power per unit area per unit wavelength value; and
generating a parameterized representation of the spectral power distribution curve, wherein the sending the first difference comprises sending the parameterized representation of the spectral power distribution curve.

13. A computing device comprising:
at least one processor; and
a computer-readable, non-transitory memory storing a plurality of instructions that when executed by the at least one processor cause the at least one processor to perform a method comprising:
receiving first video data representing a scene in an environment comprising one or more illuminated regions;
generating first illumination data representing illumination of the scene;
generating first reflectance data representing a reflectance of at least one object represented in the first video data;
sending, to a second computing device, the first illumination data and the first reflectance data;
receiving second video data representing the scene, the second video data including second illumination data and second reflectance data;
determining a first difference between the first and the second illumination data; and
sending the first difference to the second computing device.

14. The computing device of claim 13, wherein the plurality of instructions, when executed by the at least one processor, are effective to cause the at least one processor to perform the method further comprising:
determining a spectral power distribution curve of the second video data, wherein the spectral power distribution curve comprises, for each illuminated region in the scene, a power per unit area per unit wavelength value, wherein the first difference comprises a numerical representation of the spectral power distribution curve.

15. The computing device of claim 14, wherein the plurality of instructions, when executed by the at least one processor, are effective to cause the at least one processor to perform the method further comprising:
   determining a polynomial that approximates the spectral power distribution curve;
   determining coefficients of the polynomial; and
   generating a representation of the coefficients, wherein the numerical representation of the spectral power distribution curve comprises the numerical representation of the coefficients.

16. The computing device of claim 13, wherein the plurality of instructions, when executed by the at least one processor, are effective to cause the at least one processor to perform the method further comprising:
   determining, for a first pixel of the second video data, a motion vector representing a change between the first pixel of the second video data and a corresponding second pixel of the first video data, wherein the change represents motion within the scene;
   generating a frame of image data comprising the first difference and the motion vector; and
   sending the frame of image data to the second computing device.

17. The computing device of claim 13, wherein the first reflectance data represents reflectance of a first surface of a first object represented in the first video data and the first illumination data represents shading of the first surface of the first object, and wherein the plurality of instructions, when executed by the at least one processor, are effective to cause the at least one processor to perform the method further comprising:
   generating third reflectance data representing reflectance of a second surface of the first object represented in the first video data;
   generating third illumination data representing shading of the second surface of the first object; and
   generating a frame of image data, the frame of image data comprising the first reflectance data, the third reflectance data, the first illumination data, and the third illumination data, wherein sending the first illumination data and the first reflectance data to the second computing device comprises sending the frame of image data to the second computing device.

18. The computing device of claim 13, wherein the plurality of instructions, when executed by the at least one processor, are effective to cause the at least one processor to perform the method further comprising:
   determining that greater than a threshold number of pixels in third video data representing the scene in the environment do not correspond to any pixels in the first video data;
   generating third illumination data representing illumination of the scene in the third video data;
   generating third reflectance data representing a third reflectance of the at least one object of the scene in the third video data; and
   sending, to the second computing device, the third illumination data and the third reflectance data.

19. The computing device of claim 13, wherein the plurality of instructions, when executed by the at least one processor, are effective to cause the at least one processor to perform the method further comprising:
   generating a first compressed representation of the first reflectance data; and
   generating a second compressed representation of the first illumination data, wherein the sending the first illumination data and the first reflectance data comprises sending the first compressed representation and the second compressed representation to the second computing device.

20. The computing device of claim 13, wherein the plurality of instructions, when executed by the at least one processor, are effective to cause the at least one processor to perform the method further comprising:
   determining a spectral power distribution curve of the second video data, wherein the spectral power distribution curve comprises, for each illuminated region in the scene, a power per unit area per unit wavelength value; and
   generating a parameterized representation of the spectral power distribution curve, wherein the sending the first difference comprises sending the parameterized representation of the spectral power distribution curve.

* * * * *